(12) United States Patent
Weeks et al.

(10) Patent No.: US 8,413,241 B2
(45) Date of Patent: Apr. 2, 2013

(54) INTEGRATED INTRUSION DEFLECTION, DETECTION AND INTROSPECTION

(75) Inventors: John E. Weeks, Newark, CA (US); Christoph L. Schuba, Mountain View, CA (US)

(73) Assignee: Oracle America, Inc.

( * ) Notice: Subject to any disclaimer, the term of this patent is extended or adjusted under 35 U.S.C. 154(b) by 653 days.

(21) Appl. No.: 12/625,031

(22) Filed: Nov. 24, 2009

(65) Prior Publication Data

US 2011/0067107 A1     Mar. 17, 2011

Related U.S. Application Data

(60) Provisional application No. 61/243,255, filed on Sep. 17, 2009.

(51) Int. Cl.
     *G06F 21/00*       (2006.01)
(52) U.S. Cl. .......... 726/23; 709/215; 709/224; 370/252; 717/108; 726/16; 726/22
(58) Field of Classification Search ............. 726/22, 726/23
See application file for complete search history.

(56) References Cited

U.S. PATENT DOCUMENTS

| | | | |
|---|---|---|---|
| 6,085,238 A * | 7/2000 | Yuasa et al. | 709/223 |
| 6,230,312 B1 * | 5/2001 | Hunt | 717/108 |
| 2003/0130833 A1 * | 7/2003 | Brownell et al. | 703/23 |
| 2004/0073642 A1 * | 4/2004 | Iyer | 709/223 |
| 2005/0193429 A1 * | 9/2005 | Demopoulos et al. | 726/23 |
| 2006/0101516 A1 * | 5/2006 | Sudaharan et al. | 726/23 |
| 2009/0064331 A1 * | 3/2009 | Lyle et al. | 726/22 |

OTHER PUBLICATIONS http://www.crcnetbase.com/doi/pdf/10.1201/b10738-2|Honeypots|2001|Anjali Sardana|.*

\* cited by examiner

*Primary Examiner* — Taghi Arani
*Assistant Examiner* — Mahfuzur Rahman
(74) *Attorney, Agent, or Firm* — Park, Vaughan, Fleming & Dowler LLP

(57) ABSTRACT

Methods and apparatus are provided for integrated deflection, detection and intrusion. Within a single computer system configured for operating system virtualization (e.g., Solaris™, OpenSolaris™), multiple security functions execute in logically independent zones or containers, under the control and administration of a global zone. Such functions may illustratively include a demilitarized zone (DMZ) and a honeypot. Management is facilitated because all functions work within a single operating system, which promotes the ability to configure, monitor and control each function. Any given zone can be configured with limited resources, a virtual network interface circuit and/or other features.

17 Claims, 4 Drawing Sheets

INTEGRATED INTRUSION DEFLECTION, DETECTION AND INTROSPECTION

RELATED APPLICATION

This application hereby claims priority under 35 U.S.C. §119 to U.S. Provisional Application No. 61/243,255, entitled "Integrated Intrusion Deflection, Detection and Introspection," by inventors Christoph L. Schuba and John E. Weeks, filed 17 Sep. 2009, which is hereby incorporated by reference.

BACKGROUND

1. Field of the Invention

This invention relates to the field of computer security. More particularly, methods and apparatus are provided for integrated intrusion deflection, detection and introspection.

2. Related Art

Intrusion into an organization's network can be difficult to deflect or detect without sophisticated tools and processes, such as firewalls, honeypots, demilitarized zones (DMZs), packet filtering, stateful packet inspection, and so on. DMZs are employed to separate external users and potential intruders from an organization's internal computer resources, while honeypots are used to lure potential attackers to isolated computer systems that are instrumented to detect and monitor intrusion attempts.

Large organizations tend to operate large networks, and therefore usually dedicate multiple computer systems to operating computer security tools and processes. For example, both DMZs and honeypots traditionally require dedicated hardware and must be individually monitored, and the amount of external traffic may require multiple dedicated computer systems—depending on the size of the network, number and configuration of external connections, and/or other factors.

Thus, management and administration of network security tools and processes can be very time-consuming and complex, and any mistake in their configuration or operation may open security vulnerabilities that potential intruders are only too happy to exploit. As a network expands and evolves, more and more dedicated resources may need to be deployed, thereby making the network's security even more complex.

SUMMARY

In some embodiments of the invention, methods and apparatus are provided for integrated network intrusion deflection, detection and introspection within a single computer system.

The single system is configured with an operating system (e.g., Solaris™, OpenSolaris™) that supports virtualization with a single operating system instance. Through virtualization of the single operating system instance, multiple security functions can execute in logically independent zones or containers, under the control and administration of a global zone.

Illustrative computer security functions that may be deployed within different zones include a demilitarized zone (DMZ) and a honeypot, more than one of which may be instantiated in the same system. Illustratively, multiple instances of a zone may be instantiated for different subnets within an organization's network, thereby allowing the single computer system to manage security functions throughout the network.

Management of the integrated security system is facilitated because all functions work within the single operating system instance. One result is that configuration, monitoring and control of the various functions are much easier than in a network in which the functions are distributed among multiple computer systems.

Through the global zone, any given non-global zone can be configured with one or more virtual network interface circuits and/or with limited resources (e.g., CPU, memory, disk storage) to further reduce a potential attacker's impact, and/or other features. Individual non-global zones can be dynamically stopped, deleted, reconfigured and restarted, perhaps to respond to particular intrusion attempts. And, after a suitable zone configuration is established, that configuration may be used as a template and replicated as desired to initialize other zones.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the present invention. Thus, the present invention is not intended to be limited to the embodiments shown, but is to be accorded the widest scope consistent with the principles and features disclosed herein.

In some embodiments of the invention, integrated security apparatus and methods are provided for intrusion deflection, detection and/or introspection. Thus, a potential or actual intruder may be prevented from intruding into protected resources within an organization's network or, if he has intruded, can be detected, isolated, observed and even deceived regarding the extent or success of his or her intrusion.

In these embodiments, the functional security components are instantiated within zones (or containers or other logical partitions) of a single computer system configured to operate the integrated security system. Such components may illustratively include one or more demilitarized zones (DMZs), honeypots, malware detectors, etc. Generally, different components may be instantiated in different zones, but this is not required.

Because of the efficient and effective nature of the integrated security system, applications and services (e.g., a web server, a mail server, a database) may be executed in other zones of the same computer system, simultaneous with the security functions, and still be isolated and protected from attempted intrusions. Virtualization of the computer system's operating system and networking components facilitate the integration of the various security elements.

Embodiments of the invention are described herein as they may be implemented within a computer system that operates the Solaris™ operating system by Sun Microsystems, Inc., but other embodiments may employ Linux®, Unix®, Microsoft® Windows® or other operating systems.

Figure 1:
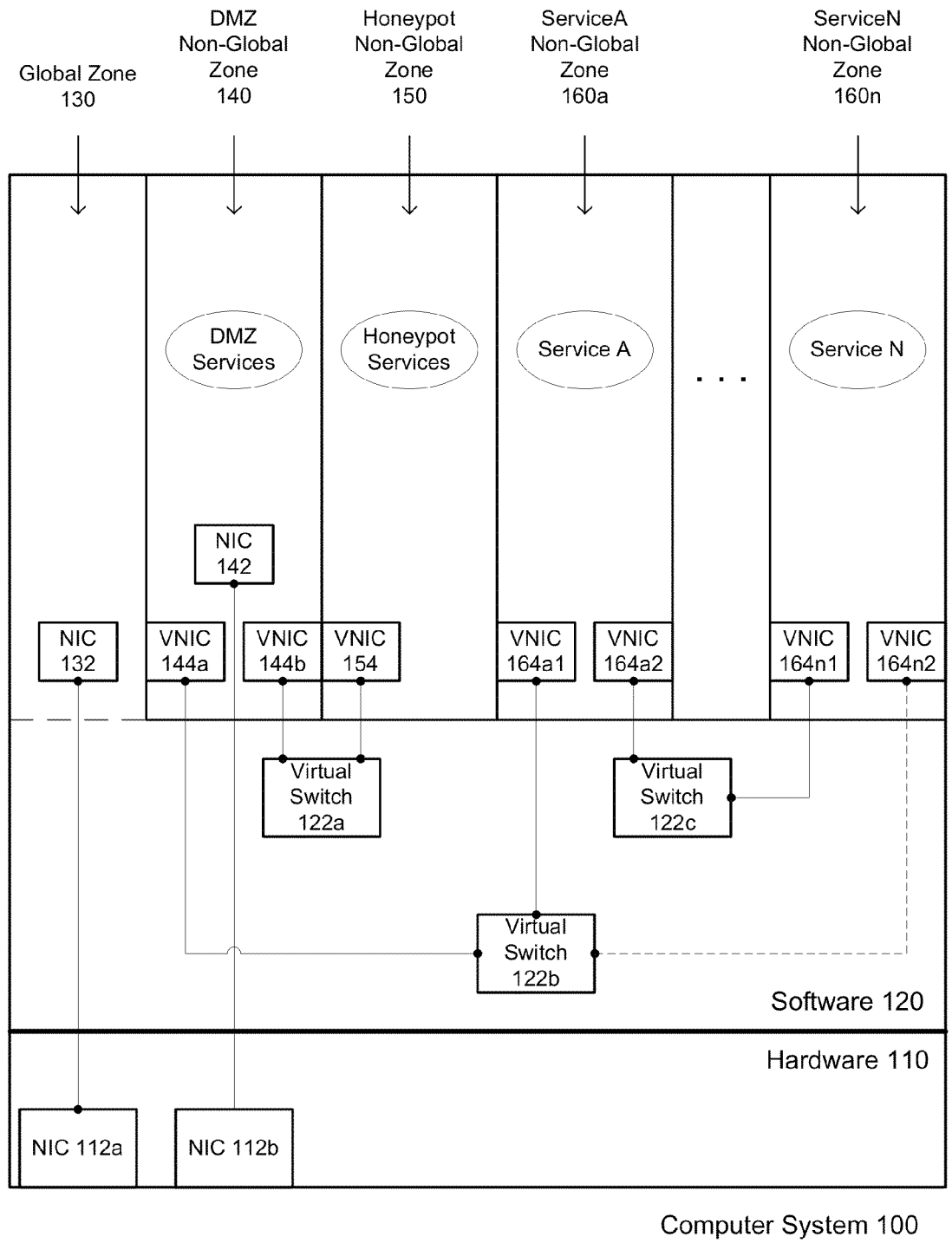
FIG. 1 is a block diagram depicting a computing environment in which integrated network security may be performed in accordance with some embodiments of the present invention.

FIG. 1 is a block diagram depicting a computing environment in which integrated network security may be performed in accordance with some embodiments of the present invention.

In these embodiments, central computer system 100 comprises hardware 110 and software 120, and within the software domain employs operating system virtualization to create separate logical zones or containers for different functions and applications. For example, OpenSolaris™ by Sun Microsystems, Inc. supports the creation of multiple non-global zones 140, 150, 160, as well as global zone 130 for administering the computer system and all elements and zones therein.

In FIG. 1, non-global zone 140 is dedicated to operating a demilitarized zone, non-global zone 150 is dedicated to function as a honeypot, and non-global zones 160a-160n are configured to execute any desired services or applications (e.g., a web server, electronic mail, database). In other embodiments, a computer system configured to provide an integrated security system may instantiate any number of non-global zones (more or fewer than shown in FIG. 1), and may execute only security functions, only applications or services, or some mix of security functions and applications. More than one instance of a given security function or application may be instantiated in computer system 100.

Virtualization within computer system 100 encompasses networking, with physical network interface circuits (NICs) 112a, 112b supporting any number of virtual NICs (VNICs). Each logical zone may therefore be configured to provide NIC-based and/or VNIC-based communication endpoints to an application or service executing within the zone. Although only two physical NICs are illustrated in FIG. 1, other embodiments may employ any number (one or more).

As shown in FIG. 1, global zone 130 is connected only to an internal administrative network of the organization served by computer system 100 (i.e., via NIC 112a), and not to any external network (e.g., through NIC 112b). Through z login, administrative commands and/or other management tools, global zone 130 can control all non-global zones.

Each non-global zone has at least one virtual NIC: VNICs 144a, 144b serve DMZ 140, VNIC 154 operates for honeypot non-global zone 150, VNICs 164a1, 164a2 are instantiated within ServiceA non-global zone 160a, and VNICs 164n1, 164n2 serve ServiceN non-global zone 160n.

It may be noted that DMZ 140 is connected only to an external network (i.e., via NIC 112b), and no internal network (e.g., via NIC 112a), but is coupled to honeypot non-global zone 150 and service non-global zones 160 via virtual NICs 144a, 144b. Honeypot zone 150 is a landing zone for suspicious traffic, and is therefore isolated from all networks and all other zones (except for receiving traffic redirected from DMZ 140).

Virtual switches 122 are created within software 120 for the purpose of switching and routing traffic between zones. Thus, in the illustrated embodiments of the invention, virtual switch 122a allows DMZ 140 to isolate suspicious traffic by trapping it in honeypot zone 150. Switch 122b allows the DMZ to reroute traffic from the external network to one or more service non-global zones 160, while switch 122c permits traffic to be routed between services.

Each service non-global zone 160 provides one or more services or applications and is coupled to DMZ 140, which redirects incoming traffic as warranted. A service zone 160 may also be coupled to one or more other service zones. Thus, multiple service zones may cooperate to provide one or more services in unison or in sequence (e.g., web server, followed by business application server, followed by database server).

Within software domain 120 of computer system 100, a single instance of an operating system is executed (e.g., Solaris™, OpenSolaris™). Within the operating system, each non-global zone is logically partitioned to operate like a separate computing device, and so cannot access the global zone or another non-global zone except across a virtual network connection or other virtual communication link created by the global zone.

In particular, because the zones are configured as separate virtual computing devices, with separate network (e.g., IP or Internet Protocol) addresses, they cannot interact via IPC (Inter-Process Communications). Because these connections are virtual, and reside within the single operating system instance, that instance can easily monitor and filter communications directed to and/or from a given zone.

Although it supports multiple independent zones, because the operating system is configured to support the illustrated virtualization, little overhead is incurred in creating, maintaining and enforcing isolation among the zones. For example, when a process or thread within a zone attempts some action, the operating system merely needs to examine the corresponding zone's zone identification and determine whether it has the necessary privileges and access permissions.

Because interaction between zones is handled by the operating system (the kernel), security restrictions can be enforced very effectively. Even though each zone acts as if it is communicating with other entities via network communication links and processes, and inter-zone communications may transit a physical NIC 112, they are really just interacting via operating system calls. Therefore, fewer program entities are subject to attack.

Computer system 100 of FIG. 1 is thus capable of providing integrated security functions for an organization's entire network. Whereas an organization may have previously deployed multiple honeypots and/or DMZs using separate computer systems, possibly in different subnets, computer system 100 can replace them all. Different honeypots and DMZs operating within different non-global zones of an integrated security system, such as in FIG. 1, may even operate within different logical subnets if they are bound to different physical NICs 112.

Global zone 130 of computer system 100 is used to configure, create, stop, start and remove any of non-global zones 140, 150, 160. Because the non-global zones' separate filesystems are logical subdivisions of the operating system/global zone's filesystem, the global zone can dynamically alter a non-global zone's files. Similarly, through introspection, the global zone can examine virtually any aspect of any process or thread operating within a non-global zone.

Further, the global zone may use Solaris DTrace or a comparable tool to monitor individual system calls and operations. For example, an administrator may choose to view all writes to (and/or reads from) a particular file within a particular zone (or by a particular process or thread within a zone), look into a zone's process table, delete a particular process, sniff a network connection, etc.

Introspection can therefore occur seamlessly within the integrated security system. In particular, no semantic gap exists between the global zone and individual non-global zones, and so there is no difficulty in determining, within the global zone, what is occurring within a non-global zone.

In addition, auditing of a particular program entity within a zone is managed by the operating system and the global zone, and so an entity being audited can be prevented from accessing the audit data or from even knowing that it is being audited.

In an illustrative deployment of an integrated computer security system such as that provided by computer system 100 of FIG. 1, one physical NIC (e.g., NIC 112a) may be coupled to an organization's internal network, while another (e.g., NIC 112b) may be coupled to an external network (e.g., the Internet). Thus, all access from the external network can be controlled by directing inbound communications appropriately.

In particular, by funneling all unsolicited incoming traffic from an external network to a DMZ zone (e.g., zone 140 of system 100 in FIG. 1), that zone can examine and reroute it as desired (e.g., based on packet filtering rules). Thus, incoming traffic that appears legitimate and is directed to port 80, port 8080 or port 443 of the organization's web server may be forwarded to a suitable service zone 160 (e.g., a web server) or to a web server operating on a different computer system.

In contrast, suspect traffic (e.g., an attempt to open a secure shell connection via port 22) may be redirected to a honeypot zone (e.g., zone 150 in FIG. 1) where the connection can be monitored without danger to other zones or computer systems. Because the rerouting or redirection is performed within the operating system, without a proxy server, there is no communication routing or process that can be attacked.

In this illustrative deployment, traffic received from the external network must pass review within DMZ zone 140 before it can reach a web server, MySQL® server, email server or other service or application that a potential intruder may target. Any traffic that does not appear to be legitimate can be deflected to honeypot zone 150 and be thoroughly investigated through introspection.

Because administration of the integrated security system is only possible via the global zone, and in this example the global zone is only accessible via the internal network, the system can only be managed via a local connection and hacking into the global zone from outside the organization is blocked.

Figure 2:
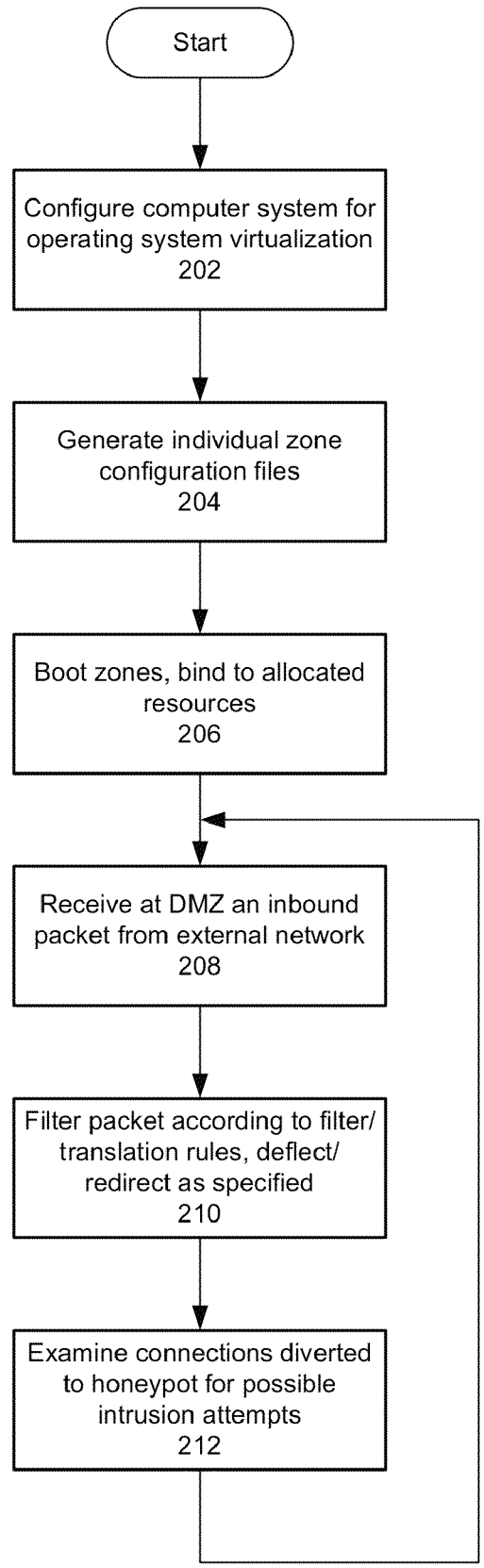
FIG. 2 is a flow chart illustrating a method of implementing integrated network intrusion deflection, detection and introspection, in accordance with some embodiments of the invention.

FIG. 2 is a flow chart demonstrating a method of configuring and operating a computer system to provide integrated network detection, deflection and introspection, according to some embodiments of the invention.

In these embodiments, in operation 202 a single computer system is installed for use as an integrated security system for an organization's network, and is configured for OS (Operating System) virtualization as described above. In particular, an operating system is installed that is capable of supporting multiple independent non-global zones or containers under the control of a global zone.

In operation 204, configuration files are assembled for individual non-global zones. As described herein, any portion of the computer system's physical resources may be allocated to a particular zone, such as some amount of memory, disk storage, processor time/cycles, network bandwidth, etc.

Illustratively, a front-line of defense such as a DMZ may be configured to receive all incoming communications from external networks. From the DMZ, valid communications are routed to their respective destinations (e.g., electronic mail server, web server) while suspect and malicious packets are diverted to one or more honeypot zones for examination.

In operation 206, the non-global zones are booted and execute their startup procedures to bind resources, load drivers and so on. Each non-global zone behaves like a separate computing device even though in reality it is sharing the single computer system's resources.

In operation 208, an inbound packet is received at the computer system from an external network. As described above, the packet is delivered to a non-global zone operating a DMZ.

In operation 210, within the DMZ a set of IP filtering rules, translation rules or other packet processing rules or commands are applied to determine how to handle the packet. The packet may be filtered based on source and/or destination addresses/ports, protocol, protocol options, etc. Based on the filtering, the packet may be redirected to a valid application or service, may be dropped or may be deflected to a honeypot zone or other zone for introspection or analysis.

In operation 212, the packet is examined with DTrace or some other tool if it is suspected or determined to be part of an intrusion action or attempt. This packet and subsequent communications in the same connection may be analyzed to identify a type of attack, a target and/or source of the attack, to determine if it constitutes a new type of attack, to determine whether an exploitable vulnerability exists in the network, etc. Depending on what is revealed in the examination, the communication may be redirected to another, specialized, honeypot or tool that takes further action.

As one of ordinary skill in the art will recognize, different portions of the method illustrated in FIG. 2 may be initiated at any given time, based on traffic received at the computer system. For example, additional packets and communication connections may continue to be received even as one packet or connection is being routed to a service or honeypot zone, or is being analyzed within a honeypot zone. Further, and as mentioned previously, a honeypot zone may be dynamically instantiated to handle one or more particular communication connections or packets, without affecting other aspects of the integrated system.

Thus, other embodiments of the invention may be readily derived from the method illustrated in FIG. 2 and this specification.

TABLE 1 lists a portion of an exemplary configuration file for configuring a non-global zone to act as a DMZ within an integrated intrusion deflection, detection and introspection system according to some embodiments of the invention. This configuration file is stored with the DMZ's filesystem (e.g., at /etc/ipf/ipnat.conf) and is accessible only to the global zone and the DMZ. The configuration file may be made immutable to the DMZ.

TABLE 1

```
#      External network interface
ext_if = iprb0;

#      Map valid web traffic to web server zone
rdr $ext_if 129.146.228.143/32 port 80 -> 10.1.9.11 port 8080 tcp
rdr $ext_if 129.146.228.143/32 port 8080 -> 10.1.9.11 port 8080 tcp
rdr $ext_if 129.146.228.143/32 port 443 -> 10.1.9.11 port 8181 tcp

#      Map all other traffic to honeypot zone
rdr $ext_if 129.146.228.143/32 -> 10.1.69.11

```

In this example configuration, a particular NIC (iprb0) is identified as an interface to an external network. Traffic received via that interface and directed to a valid port of the organization's web server at IP address 129.146.228.143 is redirected to the web server (at IP address 10.1.9.11). All other traffic is deflected to a honeypot zone having a different address (i.e., 10.1.69.11). This redirection is performed within the operating system acting as the DMZ, and therefore is not only rapid but secure.

TABLE 2 is a set of exemplary IP filtering rules (e.g., at /etc/ipf/ipf.conf) for preventing any communication connections deflected to a honeypot zone from reaching out of that zone (e.g., to access another zone or the organization's internal network). These rules may operate within the DMZ that scans incoming traffic and that originally deflected a connection to the honeypot.

TABLE 2

```
#      Block traffic from honeypot zone
block in quick on hpot_fe0 from any to 10.1.9.0/24 keep state
block in quick on hpot_fe0 from any to 129.146.228.143/32 keep state

#      Block traffic from web server zone
block in quick on web_fe0 from any to 10.1.9.0/24 keep state
block in quick on web_fe0 from any to 129.146.228.143/32 keep state

#      Other filters
block in log first quick on iprb0 proto tcp from any to any flags FUP
block in quick on iprb0 all with ipopts
```

In these rules, "hpot_fe0" and "web_fe0" refer to virtual NICs coupling the DMZ to the honeypot zone and the web server zone, respectively. More particularly, a virtual network link between the DMZ and the honeypot zone (or web server zone) comprises a virtual NIC within the DMZ labeled hpot_fe0 (or web_fe0), representing the front end, and a virtual NIC within the honeypot zone (or web server zone) named hpot_be0 (or web_be0), representing the back end.

Thus, the IP filtering in TABLE 2 serves to block return traffic to the DMZ (IP address 10.1.9.0) from the honeypot or the web server zone, regardless of whether that traffic targets the DMZ itself or some other part of the organization. Illustratively, IP address 129.146.228.143 corresponds to a physical NIC, within the single computer system, that is coupled to the organization's internal network.

In the "Other filters" portion of the filtering rules, incoming traffic that doesn't match a previous rule is blocked if it is TCP (Transport Control Protocol) traffic or if it employs IP options.

TABLE 3 comprises an exemplary configuration of a honeypot zone. The configuration is particularly intended to limit the honeypot's use of CPU and memory resources. By limiting the honeypot's available resources, an intruder's ability to exploit that zone or to attempt to engage in other activity, such as initiating a Denial of Service (DOS) attack or a ping flood, can be severely limited.

TABLE 3

```
create
set zonepath = /zones/hpot
set ip-type = exclusive

add net
set physical = "hpot_be0"
end

set limitpriv = "default, net_icmpaccess"

add capped-cpu
set ncpus = 0.25
end

add capped-memory
set physical = 64m
set swap = 50m
```

TABLE 3-continued

```
end

verify
commit
exit
```

In TABLE 3, the root of the honeypot zone's filesystem is set to /zone/hpot, within the global zone's filesystem. Although the global zone can access and manipulate the honeypot zone's filesystem, the honeypot zone cannot back up or out of its logically isolated filesystem.

In the "add net" portion of the configuration, the honeypot zone is instructed to bind to a virtual NIC identified as "hpot_be0". Then, the privileges granted to the zone (including to its root account) are limited to the "default" subset plus net_icmpaccess.

In the "add capped-cpu" section, the honeypot zone is limited to using one-quarter of one CPU at any given time. Thus, even if the single computer system comprises multiple CPUs, this zone is limited regarding the amount of CPU resources it can employ. In the "add capped-memory" portion, the honeypot zone is limited to 64 MB of physical memory (e.g., RAM) and 50 MB of swap space.

In some embodiments of the invention, after an incoming packet or communication connection is deflected to a honeypot zone, further filtering or analysis may be applied in that zone to redirect it yet further. For example, depending on a type of intrusion an attacker attempts, it may be desired to monitor it in different ways, offer different decoy targets, etc.

Should an attacker or intruder damage or exploit a honeypot zone or DMZ, through the single computer system's global zone that non-global zone can dynamically stopped and/or deleted. The honeypot zone could then be reconfigured and restarted. Because the global zone and non-global zones reside within one operating system instance, a non-global zone can be stopped, started, replicated or modified very quickly.

Within any non-global zone, the global zone can perform introspection using Solaris DTrace, may monitor log and administration files, may inspect audit records, may sniff a network connection, etc. Yet further, a non-global zone can be stopped and restarted with different (e.g., fewer) privileges, packages can be removed (e.g., ssh, sshd, rcmd), etc.

In some illustrative embodiments of the invention, introspection of packets received within a demilitarized zone or other zone configured to receive incoming traffic may reveal that several external IP addresses are attempting to saturate the organization's web server (or other application/service). In response, a honeypot zone may be dynamically configured and provisioned with some (e.g., minimal) set of resources to accept connections on the port(s) targeted by the traffic. And, the DMZ (its filtering rules) can be dynamically altered to forward traffic to the honeypot zone based on the destination address/port and/or other characteristics.

Figure 3:
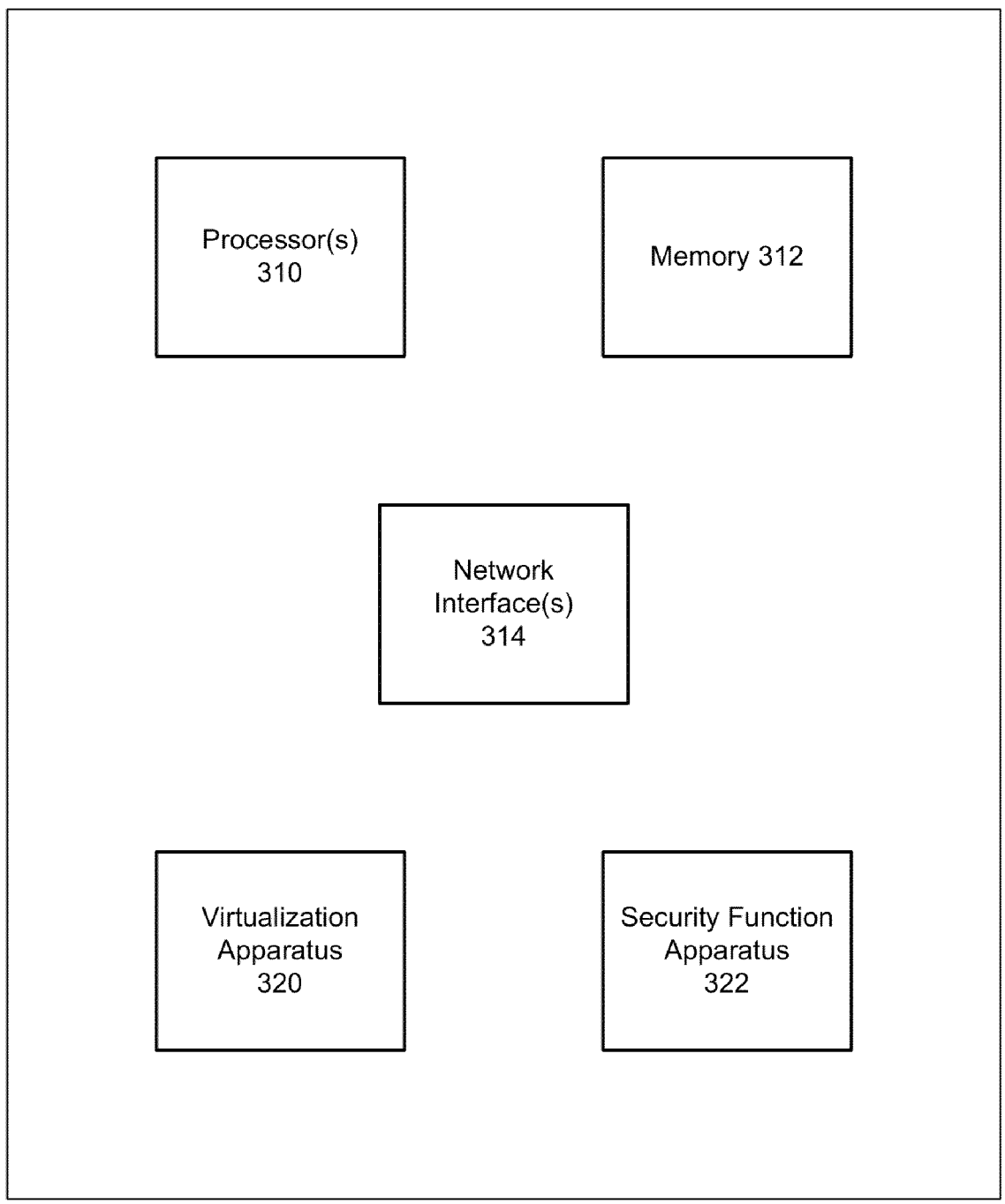
FIG. 3 is a block diagram of apparatus for implementing integrated network intrusion deflection, detection and introspection, according to some embodiments of the invention.

FIG. 3 is a block diagram of apparatus for implementing integrated network intrusion deflection, detection and introspection, according to some embodiments of the invention.

Computing apparatus 300 of FIG. 3 comprises one or more processors 310 for executing computer-executable instructions, memory 312 for storing instructions and data, and one or more network interfaces 314. Apparatus 300 also includes virtualization apparatus 320 and one or more security function apparatus 322.

Virtualization apparatus 320 is adapted to provide a virtualized operating environment within computing apparatus

300. In some embodiments, the virtualized operating environment encompasses virtualization of the operating system as well as networking. Thus, apparatus 300 supports operation of multiple logically isolated and independent zones or containers, each with one or more virtual network interfaces.

Security function apparatus 322 is/are adapted to perform security functions for a network comprising computing apparatus 300. Such functions may include one or more demilitarized zones, honeypots, packet filters, malware detectors, firewalls and so on. Different functions (and/or different instantiations of one function) may operate in the same or different logical zones within apparatus 300.

Figure 4:
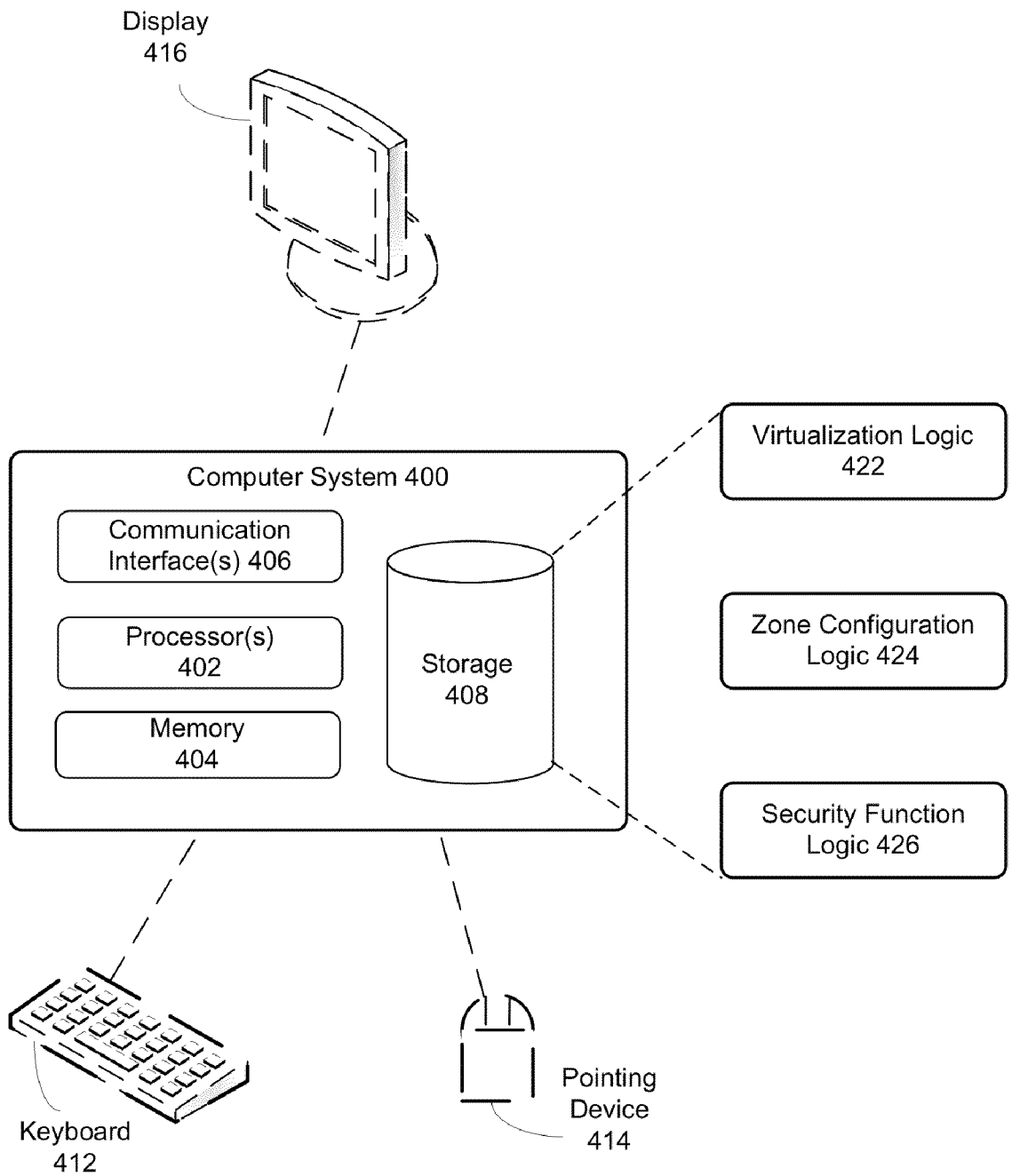
FIG. 4 is a block diagram of a computer system providing integrated network intrusion deflection, detection and introspection, according to some embodiments of the invention.

FIG. 4 is a block diagram of a computer system providing integrated network intrusion deflection, detection and introspection, according to some embodiments of the invention.

Computer system 400 of FIG. 4 comprises one or more processors 402, memory 404, one or more communication (e.g., network) interface(s) 406 and storage 406, which may comprise one or more optical and/or magnetic storage components. Computing device 400 may be coupled (permanently or transiently) to keyboard 412, pointing device 414 and display 416.

Storage 406 stores logic that may be loaded into memory 404 for execution by a processor 402. Such logic includes virtualization logic 422, zone configuration logic 424 and security function logic 426.

Virtualization logic 422 comprises processor-executable instructions for establishing and maintaining a virtual computing environment. In particular, the virtualization enables the instantiation of multiple zones that act like separate computing devices and that support the operation of logically independent security functions.

Zone configuration logic 424 comprises processor-executable instructions for configuring or re-configuring one or more zones within computer system 400.

Security function logic 426 comprises processor-executable instructions for performing one or more security functions to provide integrated intrusion deflection, detection and introspection within a network comprising computer system 400. Such functions may include, but are not limited to, demilitarized zone, honeypot, packet filtering, malware detection, etc. Multiple instances of a given function may execute within system 400.

The environment in which a present embodiment of the invention is executed may incorporate a general-purpose computer or a special-purpose device such as a hand-held computer. Details of such devices (e.g., processor, memory, data storage, display) may be omitted for the sake of clarity.

Data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), and other media capable of storing computer-readable media now known or later developed.

Methods and processes described in the detailed description can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable logic devices now known or later developed. When the hardware modules or apparatus are activated, they perform the methods and processes included within them.

The foregoing descriptions of embodiments of the invention have been presented for purposes of illustration and description only. They are not intended to be exhaustive or to limit the invention to the forms disclosed. Accordingly, many modifications and variations will be apparent to practitioners skilled in the art. The scope of the invention is defined by the appended claims, not the preceding disclosure.

What is claimed is:

1. A computer system for providing integrated computer security functions, the computer system comprising:
 a set of processors;
 a set of network interface devices coupling the computer system to one or more networks; and
 a single operating system instance comprising:
  a first demilitarized zone operating within a first non-global zone of the single operating system instance having a first network address;
  a first honeypot operating within a second non-global zone of the single operating system instance having a second network address; and
  a second demilitarized zone within a third non-global zone of the single operating system instance having a third network address;
 wherein each of the first non-global zone and the third non-global zone comprise virtual network interface devices bound to different network interface devices within the set of network interface devices; and
 wherein each of the first demilitarized zone and the second demilitarized zone operate within separate logical subnets of a network coupled to the computer system.

2. The computer system of claim 1, wherein each non-global zone of the single operating system instance comprises one or more virtual network interface devices.

3. The computer system of claim 1, wherein:
 a subset of resources of the computer system, including the set of processors, is allocated to the second non-global zone; and
 the subset of resources is configured to limit an effectiveness of a potential intruder that has initiated a communication connection with the computer system.

4. The computer system of claim 1, wherein:
 the single operating system instance further comprises a global zone for managing the single operating system instance; and
 one or more of the first non-global zone and the second non-global zone are granted only a subset of privileges granted to the global zone.

5. The computer system of claim 1, wherein the first non-global zone comprises a set of rules configured to restrict access to a network coupled to the computer system.

6. The computer system of claim 5, wherein a third non-global zone is automatically created within the single operating system based on application of the set of rules.

7. The computer system of claim 1, wherein the single operating system instance further comprises:
 one or more services operating within one or more additional non-global zones of the single operating system.

8. The computer system of claim 7, wherein:
the one or more additional non-global zones each comprise one or more virtual network interface devices for facilitating communication between the one or more additional non-global zones.

9. The computer system of claim 1, wherein the single operating system instance further comprises:
a second honeypot within a third zone of the single operating system instance having a third network address.

10. A method of providing integrated computer security functions within a single computer system, the method comprising:
within a single operating system instance executing within the single computer system:
instantiating a first non-global zone configured to operate a first demilitarized zone;
binding a first virtual network interface device with a first network address to the first non-global zone;
instantiating a second non-global zone configured to operate a honeypot;
binding a second virtual network interface device with a second network address to the second non-global zone;
instantiating a third non-global zone configured to operate a second demilitarized zone; and
binding a third virtual network interface device with a third network address to the third non-global zone;
wherein the first virtual network interface device and the third virtual network interface device are bound to different network interfaces within the single computer system;
executing a set of communication rules within the first non-global zone; and
executing logic within the second non-global zone to perform introspection of communication connections deflected to the second non-global zone from the first non-global zone.

11. The method of claim 10, further comprising:
dynamically altering said communication rules during operation of the single computer system.

12. The method of claim 10, further comprising:
instantiating a fourth non-global zone configured to analyze a communication connection comprising a packet that triggers one of the communication rules.

13. The method of claim 10, further comprising:
replicating one of the first non-global zone and the second non-global zone to facilitate instantiation of a fourth non-global zone within the single operating system instance.

14. The method of claim 10, further comprising:
limiting an amount of resources of the computer system allocated to the second non-global zone;
receiving at the single computer system a suspicious communication connection; and
redirecting the suspicious communication connection to the second non-global zone.

15. The method of claim 14, wherein the resources comprise processor resources and memory resources.

16. The method of claim 10, further comprising:
receiving a communication connection within the demilitarized zone;
dynamically instantiating a fourth non-global zone configured to operate another honeypot;
binding a fourth virtual network interface device with a fourth network address to the fourth non-global zone; and
redirecting the communication connection to the fourth non-global zone.

17. A non-transitory computer-readable medium storing instructions that, when executed by a computer, cause the computer to perform a method of providing integrated computer security functions, the method comprising:
within a single operating system instance executing within the single computer system:
instantiating a first non-global zone configured to operate a first demilitarized zone;
binding a first virtual network interface device with a first network address to the first non-global zone;
instantiating a second non-global zone configured to operate a honeypot;
binding a second virtual network interface device with a second network address to the second non-global zone;
instantiating a third non-global zone configured to operate a second demilitarized zone; and
binding a third virtual network interface device with a third network address to the third non-global zone;
wherein the first virtual network interface device and the third virtual network interface device are bound to different network interfaces within the single computer system;
executing a set of communication rules within the first non-global zone; and
executing logic within the second non-global zone to perform introspection of communication connections deflected to the second non-global zone from the first non-global zone.

* * * * *